(12) United States Patent (10) Patent No.: US 9,401,844 B2
Satterlee et al. (45) Date of Patent: *Jul. 26, 2016

(54) METHODS AND APPARATUS TO DYNAMICALLY CONTROL CONNECTIVITY WITHIN VIRTUAL PRIVATE NETWORKS

(71) Applicant: AT&T Intellectual Property I, L.P., Atlanta, GA (US)

(72) Inventors: Michael Satterlee, Clifton Park, NY (US); Neal Shackleton, Tierra Verde, FL (US); John F. Gibbons, Ballston Lake, NY (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/834,956

(22) Filed: Aug. 25, 2015

(65) Prior Publication Data
US 2015/0365287 A1 Dec. 17, 2015

Related U.S. Application Data

(63) Continuation of application No. 14/550,389, filed on Nov. 21, 2014, now Pat. No. 9,137,109, which is a continuation of application No. 13/349,305, filed on Jan. 12, 2012, now Pat. No. 8,929,367, which is a continuation of application No. 12/262,675, filed on Oct. 31, 2008, now Pat. No. 8,121,118.

(51) Int. Cl.
*H04L 12/28* (2006.01)
*H04L 12/24* (2006.01)
(Continued)

(52) U.S. Cl.
CPC ............ *H04L 41/0816* (2013.01); *H04L 12/18* (2013.01); *H04L 12/4641* (2013.01); *H04L 12/66* (2013.01); *H04L 45/02* (2013.01); *H04L 45/50* (2013.01); *H04L 65/4076* (2013.01)

(58) Field of Classification Search
CPC .................................................. H04L 41/0816
USPC .......................................................... 370/389
See application file for complete search history.

(56) References Cited

U.S. PATENT DOCUMENTS 5,623,601 A 4/1997 Vu
6,079,020 A 6/2000 Liu
(Continued)

OTHER PUBLICATIONS

The United States Patent and Trademark Office, "Notice of Allowance," issued in connection with U.S. Appl. No. 12/262,615 on Jun. 3, 2013.

(Continued)

*Primary Examiner* — Wei Zhao
(74) *Attorney, Agent, or Firm* — Hanley, Flight & Zimmerman, LLC

(57) ABSTRACT

Methods and apparatus to dynamically control connectivity within VPNs are disclosed. A disclosed example method includes a route server for storing an indication in an entry for a first pair of provider edge routers in a virtual private network (intra-VPN) connectivity database, the intra-VPN connectivity database including entries for a plurality of pairs of provider edge routers. The indication to define an additional connectivity for the first pair of provider edge routers beyond connectivity defined in a virtual private network routing and forwarding table associated with a first provider edge router of the first pair of provider edge routers. The first pair of provider edge routers including a second provider edge router to which the first provider edge router is to be communicatively coupled.

18 Claims, 4 Drawing Sheets

(51) Int. Cl.

| | | |
|---|---|---|
| H04L 12/46 | (2006.01) | |
| H04L 12/66 | (2006.01) | |
| H04L 12/751 | (2013.01) | |
| H04L 12/18 | (2006.01) | |
| H04L 12/723 | (2013.01) | |
| H04L 29/06 | (2006.01) | |

(56) References Cited

U.S. PATENT DOCUMENTS

| | | | |
|---|---|---|---|
| 6,205,488 B1 | 3/2001 | Casey et al. | |
| 6,636,898 B1 | 10/2003 | Ludovici et al. | |
| 6,781,982 B1 | 8/2004 | Borella et al. | |
| 7,072,346 B2 | 7/2006 | Hama | |
| 7,075,933 B2 | 7/2006 | Aysan | |
| 7,131,141 B1 | 10/2006 | Blewett et al. | |
| 7,185,106 B1 | 2/2007 | Moberg et al. | |
| 7,221,675 B2 | 5/2007 | Bryden et al. | |
| 7,225,270 B2 | 5/2007 | Barret et al. | |
| 7,340,519 B1 | 3/2008 | Golan et al. | |
| 7,366,188 B2 | 4/2008 | Kim | |
| 7,388,844 B1 | 6/2008 | Brown et al. | |
| 7,400,611 B2 | 7/2008 | Mukherjee et al. | |
| 7,564,802 B2 * | 7/2009 | Andrapalliyal | H04L 12/4679 370/254 |
| 7,616,574 B2 | 11/2009 | Previdi et al. | |
| 7,751,405 B1 | 7/2010 | Kompella | |
| 7,870,604 B1 | 1/2011 | Guichard et al. | |
| 7,912,856 B2 | 3/2011 | Hannel et al. | |
| 7,921,686 B2 | 4/2011 | Bagepalli et al. | |
| 8,027,347 B2 | 9/2011 | Ould-Brahim | |
| 8,064,440 B2 | 11/2011 | Bhaskar | |
| 8,117,325 B1 | 2/2012 | Wu | |
| 8,117,338 B2 | 2/2012 | Ould-Brahim | |
| 8,121,118 B2 | 2/2012 | Satterlee et al. | |
| 8,549,616 B2 | 10/2013 | Gerber et al. | |
| 8,929,367 B2 | 1/2015 | Satterlee et al. | |
| 9,137,109 B2 * | 9/2015 | Satterlee | H04L 12/4641 |
| 2002/0181477 A1 | 12/2002 | Mo et al. | |
| 2003/0016672 A1 * | 1/2003 | Rosen | H04L 12/4645 370/392 |
| 2003/0188001 A1 | 10/2003 | Eisenberg et al. | |
| 2004/0148439 A1 | 7/2004 | Harvey et al. | |
| 2005/0066053 A1 | 3/2005 | McDysan | |
| 2006/0165087 A1 | 7/2006 | Page et al. | |
| 2006/0168279 A1 | 7/2006 | Lee et al. | |
| 2006/0168321 A1 | 7/2006 | Eisenberg et al. | |
| 2006/0251088 A1 | 11/2006 | Thubert et al. | |
| 2007/0133577 A1 | 6/2007 | Dong | |
| 2007/0140250 A1 | 6/2007 | McAllister et al. | |
| 2007/0140251 A1 | 6/2007 | Dong | |
| 2007/0195800 A1 | 8/2007 | Yang et al. | |
| 2007/0217419 A1 | 9/2007 | Vasseur | |
| 2007/0280241 A1 | 12/2007 | Verma | |
| 2008/0002697 A1 | 1/2008 | Anantharamaiah et al. | |
| 2008/0049752 A1 | 2/2008 | Grant | |
| 2008/0080517 A1 | 4/2008 | Roy et al. | |
| 2008/0170578 A1 | 7/2008 | Ould-Brahim | |
| 2010/0111093 A1 | 5/2010 | Satterlee et al. | |
| 2010/0115604 A1 | 5/2010 | Gerber et al. | |

OTHER PUBLICATIONS

The United States Patent and Trademark Office, "Notice of Allowance," issued in connection with U.S. Appl. No. 12/262,615 on Feb. 20, 2013.

The United States Patent and Trademark Office, "Advisory action," issued in connection with U.S. Appl. No. 12/262,615 on Dec. 14, 2012.

United States Patent and Trademark Office. Office action. issued for U.S. Appl. No. 12/262,615, mailed on Oct. 4, 2012, 12 pages.

Cisco: IPv6 over MPLS Cisco IPv6 Provider Edge Router (6PE) Cisco IPv6 VPN Provider Edge Router (6VPE); 2006, 43 pages.

United States Patent and Trademark Office, Notice of Allowance and Fee(s) Due, issued for U.S. Appl. No. 12/262,675, mailed on Oct. 17, 2011, 16 pages.

United States Patent and Trademark Office, Non-Final Rejection, issued for U.S. Appl. No. 12/262,675, mailed on Apr. 15, 2011, 19 pages.

United States Patent and Trademark Office. Final Rejection, issued for U.S. Appl. No. 12/262,675, mailed on Oct. 4, 2010, 21 pages.

United States Patent and Trademark Office, Non-Final Rejection, issued for U.S. Appl. No. 12/262,675, mailed on May 11, 2010, 12 pages.

Rosen, et al., "BGP/MPLS IP Virtual Private Networks (VPNs)," Network Working Group, Request for Comments: 4364, The Internet Society, Feb. 2006, 47 pages.

Van Der Merwe, et al., "Dynamic Connectivity Management with an Intelligent Route Service Control Point," AT&T Labs, Proceedings of the 2006 SIGCOMM Workshop on Internet Network Management, held on Sep. 11-15, 2006, 6 pages.

Van Der Merwe, et al., PowerPoint presentation of "Dynamic Connectivity Management with an Intelligent Route Service Control Point," AT&T Labs, Proceedings of the 2006 SIGCOMM Workshop on Internet Network Management, Sep. 11-15, 2006, 14 pages.

United States Patent and Trademark Office, Final Rejection, issued for U.S. Appl. No. 12/262,615, mailed on Mar. 13, 2012, 12 pages.

United States Patent and Trademark Office, "Non-Final Office Action," issued for U.S. Appl. No. 13/349,305, mailed on May 13, 2014, 36 pages.

United States Patent and Trademark Office, "Notice of Allowance," issued for U.S. Appl. No. 13/349,305, mailed on Sep. 9, 2014, 19 pages.

United States Patent and Trademark Office, "Non-Final Office Action," issued for U.S. Appl. No. 14/550,389, mailed on Jan. 20, 2015, 25 pages.

United States Patent and Trademark Office, "Notice of Allowance," issued for U.S. Appl. No. 14/550,389, mailed on May 13, 2015, 16 pages.

* cited by examiner

| TRADITIONAL ANY-TO-ANY | A=B=C=D=E=F=G |
|---|---|
| DEFAULT NO-CONNECT | A,B,C,D,E,F,G,& H ALL DIFFERENT VALUES |
| DEFAULT HUB-SPOKE | A=C=E=H AND B=D=F=G |

METHODS AND APPARATUS TO DYNAMICALLY CONTROL CONNECTIVITY WITHIN VIRTUAL PRIVATE NETWORKS

RELATED APPLICATION

This patent arises from a continuation of U.S. patent application Ser. No. 14/550,389, entitled "Methods and apparatus to dynamically control connectivity within virtual private networks", filed Nov. 21, 2014, now U.S. Pat. No. 9,137,109, which is a continuation of U.S. patent application Ser. No. 13/349,305, entitled "Methods and apparatus to dynamically control connectivity within virtual private networks", filed Jan. 12, 2012, now U.S. Pat. No. 8,929,367, which is a continuation of U.S. patent application Ser. No. 12/262,675, entitled "Methods and apparatus to dynamically control connectivity within virtual private networks", filed on Oct. 31, 2008, now U.S. Pat. No. 8,121,118. U.S. patent application Ser. No. 14/550,389, U.S. patent application Ser. No. 13/349,305 and U.S. patent application Ser. No. 12/262,675 are hereby incorporated herein by reference in their entireties.

FIELD OF THE DISCLOSURE

This disclosure relates generally to virtual private networks (VPNs) and, more particularly, to methods and apparatus to dynamically control connectivity within VPNs.

BACKGROUND

Enterprise customers are increasingly adopting multiprotocol label switching (MPLS) based VPN services to implement a communication network among their respective customer sites via a service provider's network. Such MPLS-based VPNs provide direct any-to-any reachability among an enterprise's customer sites.

BRIEF DESCRIPTION OF THE DRAWINGS

FIG. 1 is a schematic illustration of example communication system constructed in accordance with the teachings of this disclosure.

DETAILED DESCRIPTION

Figure 2:
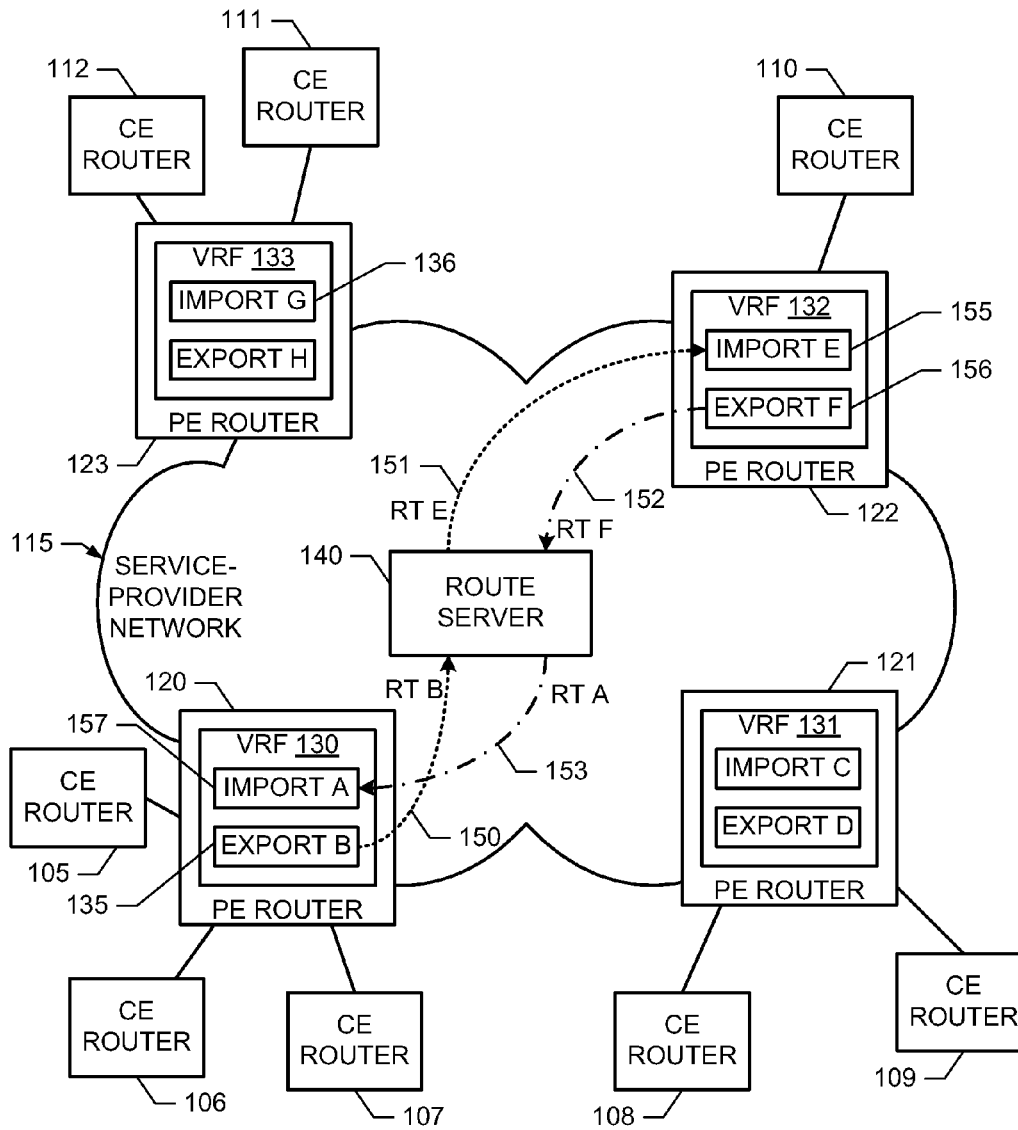
FIG. 2 illustrates example default intra-VPN connectivity configurations for the example communication system of FIG. 1.

Example methods and apparatus to dynamically control connectivity within virtual private networks (VPNs) are disclosed. A disclosed example route server to control connectivity within a VPN includes a memory to implement an intra-VPN connectivity database, a border gateway protocol (BGP) engine to process BGP advertisements, a network interface to receive a first BGP advertisement from a first provider edge (PE) router associated with the VPN, the first BGP advertisement including a first route target (RT) associated with the first PE router, and an intra-VPN connectivity controller to, in response to the first BGP advertisement, query the database to determine whether the first PE router is to be communicatively coupled to a second PE router of the VPN and when the first and second PE routers of the VPN are to be communicatively coupled, direct the BGP engine to form a second BGP advertisement based on the first BGP advertisement, the second BGP advertisement including a second RT associated with the second PE router.

A disclosed example method includes receiving a first BGP advertisement from a first PE router associated with a VPN, the first BGP advertisement including a first RT associated with the first PE router, automatically querying an intra-VPN connectivity database to determine whether the first PE router is to be communicatively coupled to a second PE router of the VPN, forming a second BGP advertisement based on the first BGP advertisement when the first and second PE routers of the VPN are to be communicatively coupled, the second BGP advertisement including a second RT associated with the second PE router, and broadcasting the second BGP advertisement.

In the interest of brevity and clarity, throughout the following disclosure references will be made to an example multi-protocol label switching (MPLS) based communication system 100 of FIG. 1. However, the methods and apparatus described herein to dynamically control connectivity within VPNs are applicable to other types of networks constructed using other technologies, topologies and/or protocols.

FIG. 1 illustrates the example MPLS-based communication system 100. To facilitate communication services between a plurality of customer edge (CE) routers, eight of which are designated at reference numerals 105-112, the example communication system 100 of FIG. 1 includes a service-provider network 115. While for ease of illustration and discussion, all of the example CE routers 105-112 are associated with a single VPN, the example communication system 100 of FIG. 1 may facilitate communication services for a plurality of VPNs. Moreover, not all of the VPNs implemented by the example communication system 100 need include and/or implement the methods and apparatus to dynamically control intra-VPN connectivity.

To route and/or transport data between and/or among the example CE routers 105-112, the example service-provider network 115 of FIG. 1 includes a plurality of PE routers, four of which are designated at reference numerals 120, 121, 122 and 123. The example PE routers 120-123 of FIG. 1 are communicatively coupled to each other via any number and/or or type(s) of communication paths (not shown) that allow any particular PE router 120-123 to communicate with at least some, but not necessarily all of, the other PE routers 120-123.

For each VPN implemented by the service-provider network 115, each of the example PE routers 120-123 of FIG. 1 has a corresponding VPN routing and forwarding (VRF) table. In the illustrated example of FIG. 1, the PE router 120 has a VRF table 130, the PE router 121 has a VRF table 131, the PE router 122 has a VRF table 132, and the PE router 123 has a VRF table 133. The example VRF tables 130-133 of FIG. 1 are associated with the VPN communicatively coupling the example CE routers 105-112. The example VRF tables 130-133 are used by the PE routers 120-123 to route and/or forward a packet received at a particular PE router 120-123 to and/or toward its final destination. In general, when a packet is received at a PE router 120-123 from a CE router 105-112 associated with a particular VPN, the PE router 120-123 uses the final destination specified and/or identified in the packet to perform a query of the VRF table 130-133 associated with that VPN. Based on a result of the query, the PE router 120-123 determines how the packet is to be routed or forwarded within the service provider network 110, and/or delivered to a particular CE router 105-112.

By sending, for example, BGP route advertisements, each of the example PE routers 120-123 of FIG. 1 publishes and/or exports information concerning the CE router(s) 105-112 that are communicatively coupled to the PE router 120-123. Isolation between different VPNs and/or between different devices of a VPN is achieved via RTs, import policies and/or export policies. Specifically, BGP advertisements and/or routes within a BGP advertisement are tagged with an RT value. The RT that is included in a BGP advertisement is defined by the export policy of the PE router 120-123 that is sending the BGP advertisement. For instance, when the example PE router 120 of FIG. 1 sends a BGP advertisement containing information regarding any of the CE routers 105-107, the BGP advertisement includes an RT B, as defined by an export policy 135 associated with the VRF table 130.

Based on received BGP route advertisements, the example PE routers 120-123 of FIG. 1 build, compile, update, maintain and/or construct their respective VRF tables 130-133. The example PE routers 120-123 import routes in accordance with their associated import policy. In the illustrated example of FIG. 1, when the example PE router 123 receives a BGP advertisement tagged with an RT, the PE router 123 compares the RT contained in the BGP advertisement with its import policy 136. If the import policy 136 specifies that routes associated with that RT are to be imported, the PE router 123 updates its VRF table 133. For example, if the BGP advertisement includes an RT G, the PE router 123 would import the routes listed in the BGP advertisement. However, BGP advertisements including other RTs would be ignored.

By configuring the import and export policies of the example VRF tables 130-133, nominal and/or default routes between the example PE routers 120-123 for the example VPN of FIG. 1 can be controlled, as shown in FIG. 2. For example, if the values A, B, C, D, E, F and G of FIG. 1 are configured to have the same value, then the example VPN of FIG. 1 is configured in the any-to-any topology traditionally utilized within VPNs. If the values A, B, C, D, E, F and G are all different, then no routes between any of PE routers 120-123 for the example VPN of FIG. 1 have been configured and/or enabled. If the values A, C, E, and H have a first value, and the values B, D, F and G have a second value, then the example VPN of FIG. 1 is configured in a hub and spoke topology. In particular, the example PE router 123 would operate as a hub router for the VPN with the other PE routers 120-122 operating as spoke routers.

Returning to FIG. 1, to facilitate sharing of routing information among the example PE routers 120-123, the example service provider network 110 of FIG. 1 includes any number of route servers, route reflectors, intelligent route reflectors and/or intelligent route service control points, one of which is designated at reference numeral 140. Because not all of the example PE routers 120-123 are necessarily communicatively coupled in a full mesh topology (for example, when at least one PE router 120-123 does not have a direct communication path to another PE router 120-123), the example route server 140 of FIG. 1 forwards BGP advertisements among and/or to the PE routers 120-123. By forwarding each received BGP advertisement, the example route server 140 enables each of the PE routers 120-123 to build, compile and/or construct a VRF table 130-133 that can be used by the PE router 120-123 to route data from any of its communicatively coupled CE routers 105-112 to none, some or all of the CE routers 105-112 communicatively coupled to other PE routers 120-123, even if such routing of data requires use of one or more intervening PE routers 120-123.

To dynamically control communication within the example VPN of FIG. 1 without having to reconfigure and/or change import and/or export policies of a VRF table 130-133, the example route server 140 of FIG. 1 forms a copy of each BGP advertisement that it receives, modifies the copy of the received BGP advertisement, and sends and/or broadcasts the modified BGP advertisement. For example, when the example PE router 120 is to be communicatively coupled to the example PE router 122 for a particular VPN and the example route server 140 of FIG. 1 receives a BGP advertisement 150 that includes the RT B associated with the export policy 135 of the VRF table 130, the example route server 140 broadcasts a version 151 of the BGP advertisement 150 that includes an RT E associated with an import policy 155 of the VRF table 132. Likewise, when the example route server 140 receives a BGP advertisement 152 that includes an RT F associated with an export policy 156 of the VRF table 132, the example route server 140 broadcasts a version 153 of the BGP advertisement 152 that includes an RT A associated an import policy 157 of the VRF table 130. When a particular PE router 120-123 is not to have additional connectivity within a VPN beyond that defined by the import and/or export policy of the PE router 120-123, the route server 140 forwards the originally received BGP advertisements 150 and 152 without making, modifying and/or sending a copy of the received BGP advertisements 150 and/or 152.

Intra-VPN connectivity enabled by the example route server 140 is in addition to any intra-VPN connectivity defined by the import and/or export policies of the VRF tables 130-132. For example, if the values A, B, C, D, E, F and G are all different, the route server 140 is the sole enabler for connectivity within the example VPN of FIG. 1. However, if the values A, C, E, and H have a first value, and the values B, D, F and G have a second value thereby enabling a hub and spoke topology with the PE router 123 operating as a hub router, the example route server 140 can be used to dynamically enable additional connectivity between the spoke PE routers 120-122.

Figure 3:
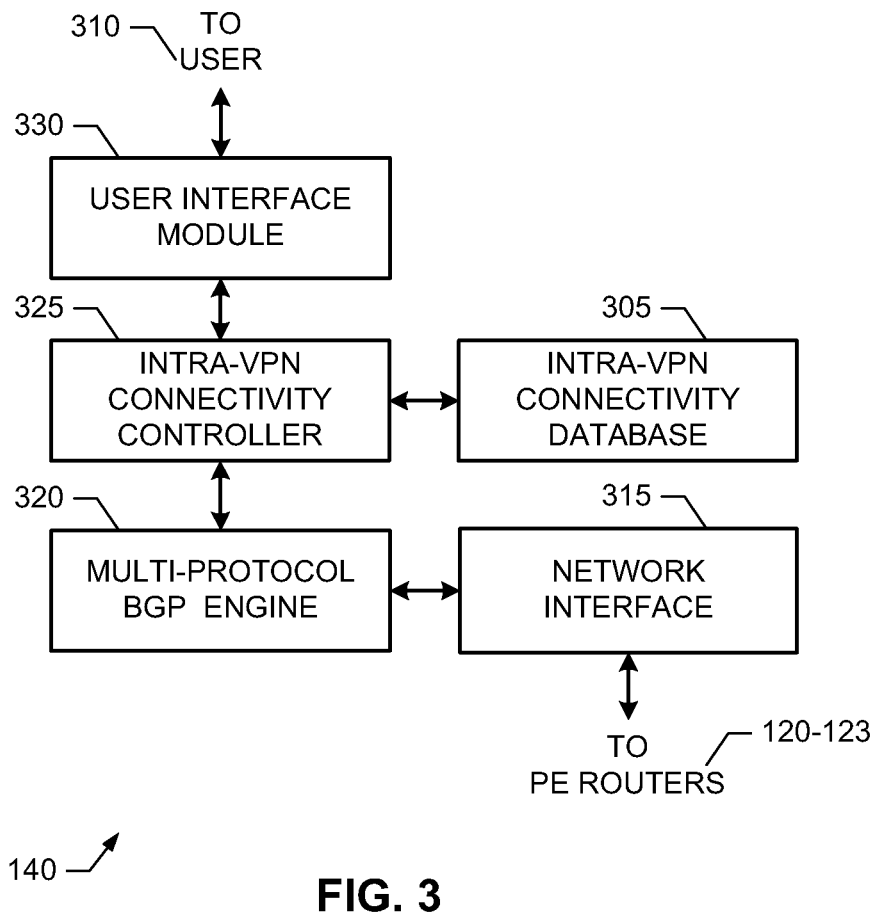
FIG. 3 illustrates an example manner of implementing a route server for the example communication system of FIG. 1.

To determine whether PE routers 120-123 are to have additional connectivity within a VPN beyond that defined by their respective import and export policies, the example route server 140 of FIG. 1 queries an intra-VPN connectivity database 305 (FIG. 3). As described below in connection with FIGS. 3 and 4, a user and/or computer 310 can dynamically and/or selectively configure connectivity within a VPN by configuring the intra-VPN connectivity database 305. An example manner of implementing the example route server 140 of FIG. 1 is described below in connection with FIG. 3.

While an example communication system has been illustrated in FIG. 1, one or more of the interfaces, data structures, elements, processes and/or devices illustrated in FIG. 1 may be combined, divided, re-arranged, omitted, eliminated and/or implemented in any other way. Further, the example PE routers 120-123 and/or the example route server 140 of FIG. 1 may be implemented by hardware, software, firmware and/or any combination of hardware, software and/or firmware. Thus, for example, any of the example PE routers 120-123 and/or the example route server 140 may be implemented by one or more circuit(s), programmable processor(s), application specific integrated circuit(s) (ASIC(s)), programmable logic device(s) (PLD(s)) and/or field programmable logic device(s) (FPLD(s)), etc. Further still, a communication system may include interfaces, data structures, elements, processes and/or devices instead of, or in addition to, those illustrated in FIG. 1 and/or may include more than one of any or all of the illustrated interfaces, data structures, elements, processes and/or devices.

FIG. 3 illustrates an example manner of implementing the example route server 140 of FIG. 1. To implement one or more interfaces to the example PE routers 120-123, the example route server 140 of FIG. 3 includes any number and/or type(s) of network interfaces, one of which is designated at reference numeral 315.

To send, receive and process BGP route advertisements, the example route server 140 of FIG. 3 includes a multi-protocol BGP engine 320. When a BGP route advertisement is received from a PE router 120-123 via the example network interface 315, the example multi-protocol BGP engine 320 of FIG. 3 forwards the received BGP route advertisement to the other PE routers 120-123. The example multi-protocol BGP engine 320 also queries an intra-VPN connectivity controller 325 to determine whether one or more modified copies of the received BGP router advertisement are to be broadcast.

To control connectivity within a VPN, the example route server 140 of FIG. 3 includes the example intra-VPN connectivity controller 325. When queried by the example multi-protocol BGP engine 320, the example intra-VPN connectivity controller 325 of FIG. 3 queries the example intra-VPN connectivity database 305 to determine whether BGP advertisements associated with a first RT are to be re-broadcast with one or more additional RT. When intra-VPN connectivity beyond that defined by import and/or export policies is to be enabled for a particular RT, the example intra-VPN connectivity controller 325 returns to the multi-protocol BGP engine 320 the one or more additional RTs with which the received BGP route advertisement is to be re-broadcast.

In response to the one more additional RTs, the example multi-protocol BGP engine 320 of FIG. 3 creates one or more corresponding copies of the received BGP advertisement, modifies the original RT to correspond with a respective one of the one or more additional RTs, and broadcasts the modified copy(-ies) of the received BGP advertisement.

Intra-VPN connectivity configuration information may be stored in the example intra-VPN connectivity database 305 using any number and/or type(s) of data structures. An example data structure that may be used to implement the example shared resource control access database 305 of FIG. 3 is described below in connection with FIG. 4. The example intra-VPN connectivity database 305 may be stored using any number and/or type(s) of memory(-ies), memory device(s) and/or storage device(s).

To allow the user and/or computer 310 to configure intra-VPN connectivity for a VPN, the example route server 140 of FIG. 3 includes any number and/or type(s) of user interface modules, one of which is designated at reference numeral 330. The example user 310 of FIG. 3 may be associated with a particular VPN, and/or be associated with an operator of the service-provider network 115. The example user interface module 330 of FIG. 3 enables the user 310 to interact with the example intra-VPN connectivity controller 325 to update the database 305 to configure connectivity within a VPN. In some examples, intra-VPN connectivity can be configured differently for different periods of time, temporarily configured with an expiration time, and/or automatically re-configured in response to a triggering event. For instance, during business hours there may be full connectivity within a VPN, with the VPN reverting to a nominal hub-and-spoke topology during non-business hours. Additionally or alternatively, if a virus and/or security anomaly is detected, connectivity within a VPN may be restricted and/or blocked to reduce the likelihood of damage. Example user interface modules 330 include, but are not limited to, a web-based interface, a voice activated response system and/or an application programming interface accessible to another computer system 310.

While an example route server 140 has been illustrated in FIG. 3, one or more of the interfaces, data structures, elements, processes and/or devices illustrated in FIG. 3 may be combined, divided, re-arranged, omitted, eliminated and/or implemented in any other way. Further, the example intra-VPN connectivity database 305, the example network interface 315, the example multi-protocol BGP engine 320, the example intra-VPN connectivity controller 325, the example user interface module 330, and/or, more generally, the example route server 140 of FIG. 3 may be implemented by hardware, software, firmware and/or any combination of hardware, software and/or firmware. Thus, for example, any or the example intra-VPN connectivity database 305, the example network interface 315, the example multi-protocol BGP engine 320, the example intra-VPN connectivity controller 325, the example user interface module 330, and/or, more generally, the example route server 140 may be implemented by one or more circuit(s), programmable processor(s), ASIC(s), PLD(s) and/or FPLD(s), etc. Further still, a route server may include interfaces, data structures, elements, processes and/or devices instead of, or in addition to, those illustrated in FIG. 3 and/or may include more than one of any or all of the illustrated interfaces, data structures, elements, processes and/or devices.

Figure 4:
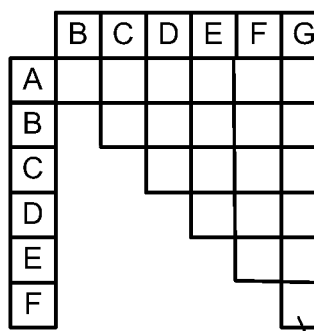
FIG. 4 illustrates an example data structure that may be used to implement an intra-VPN connectivity database for the example route server of FIG. 3.

FIG. 4 illustrates an example data structure that may be used to implement the example intra-VPN connectivity database 305 of FIG. 3. The example data structure of FIG. 4 includes a plurality of entries for respective ones of pairs of RTs, one of which is designated at reference numeral 410. Each of the example entries 410 is associated with a particular combination of RTs. For instance, the example entry 410 is associated with a combination of RT F and RT G.

To identify whether communication between the VRFs 130-133 associated with a particular combination of RTs is currently enabled, each of the example entries 410 contains one or more values, flags, rules, criteria and/or strings that represent whether the example route server 140 is to cross-communicate BGP advertisements between the RTs associated with the entry 410. Example entries 410 include, but are not limited to, a flag that indicates that connectivity between the RTs is unconditionally enabled, a time of day range that specifies when connectivity is enabled, a condition when connectivity is enabled, and/or a condition when connectivity is disabled. In some examples, the example entries 410 of FIG. 4 each contain a simple flag to indicate whether the example route server 140 is to cross-communicate BGP advertisements between the RTs associated with the entry 410. In such examples, the example user and/or computer 310 (FIG. 3) is responsible for configuring the example intra-VPN connectivity database 305 in response to one or more of conditions, time of day, day of week and/or triggering events.

While an example data structure that may be used to implement the example intra-VPN connectivity database 305 of FIG. 3 is illustrated in FIG. 4, the example data structure of FIG. 4 may be implemented using any number and/or type(s) of other and/or additional entries, fields and/or data. Further, the entries, fields and/or data illustrated in FIG. 4 may be combined, divided, re-arranged, eliminated and/or implemented in any way. Further still, the example data structures may include entries, fields and/or data in addition to, or instead of, those illustrated in FIG. 4, and/or may include more than one of any or all of the illustrated entries, fields and/or data. Moreover, the example data structure 305 of FIG. 4 may be queried using any additional and/or alternative methods.

Figure 5:
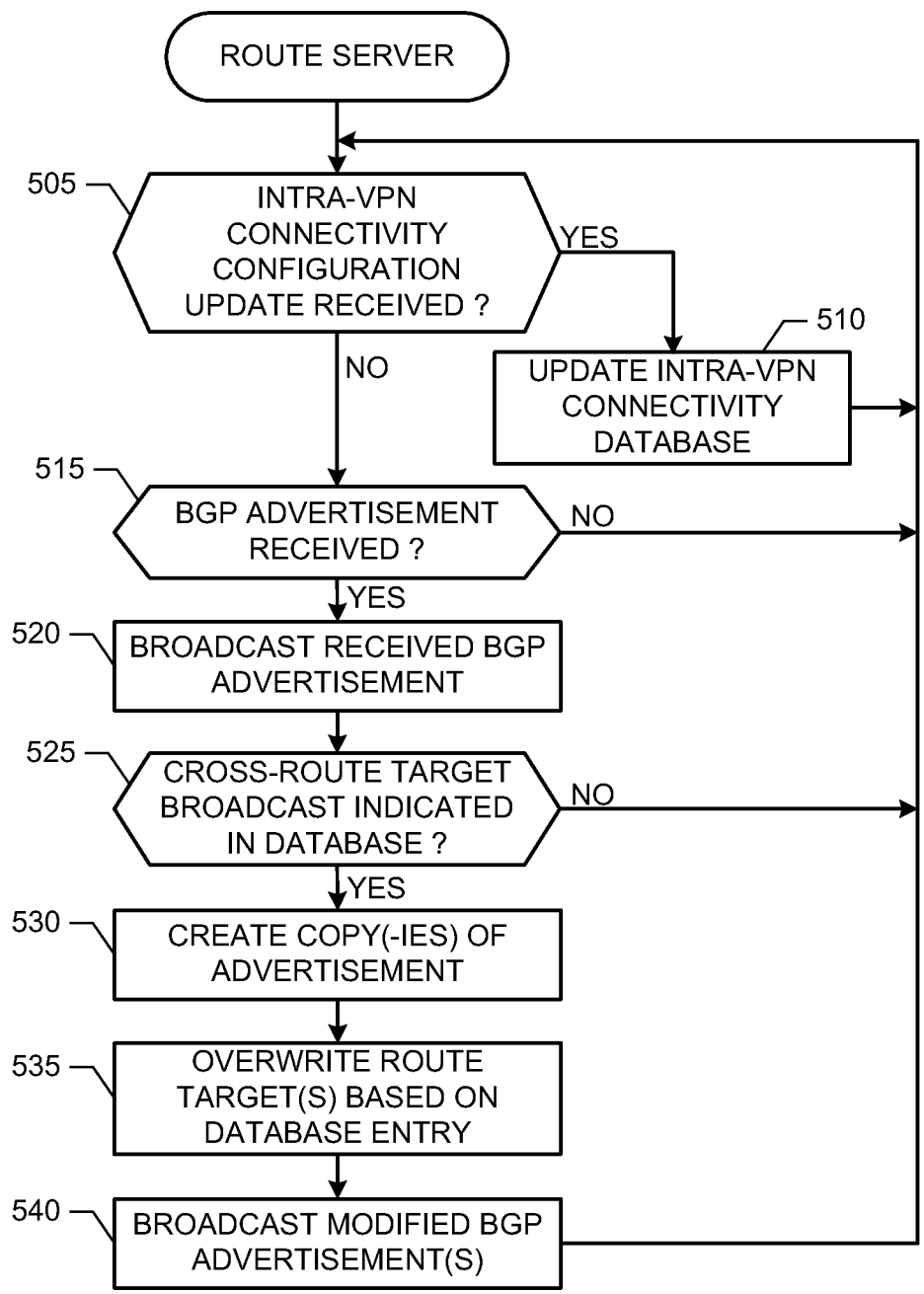
FIG. 5 is a flowchart representative of an example process that may be carried out to implement the example route servers of FIGS. 1 and/or 3.

FIG. 5 illustrates a flowchart representative of an example process that may be carried out to implement any of the example route servers 140 of FIGS. 1 and/or 3. The example process of FIG. 5 may be carried out by a processor, a controller and/or any other suitable processing device. For example, the example process of FIG. 5 may be embodied in coded instructions stored on any tangible computer-readable medium such as a flash memory, a compact disc (CD), a digital versatile disc (DVD), a floppy disk, a read-only memory (ROM), a random-access memory (RAM), a programmable ROM (PROM), an electronically-programmable ROM (EPROM), and/or an electronically-erasable PROM (EEPROM), an optical storage disk, an optical storage device, magnetic storage disk, a magnetic storage device, and/or any other medium which can be used to carry or store program code and/or instructions in the form of machine-accessible instructions or data structures, and which can be accessed by a processor, a general-purpose or special-purpose computer, or other machine with a processor (e.g., the example processor platform P100 discussed below in connection with FIG. 6). Combinations of the above are also included within the scope of computer-readable media. Machine-accessible instructions comprise, for example, instructions and/or data that cause a processor, a general-purpose computer, special-purpose computer, or a special-purpose processing machine to implement one or more particular processes. Alternatively, some or all of the example process of FIG. 5 may be implemented using any combination(s) of ASIC(s), PLD(s), FPLD(s), discrete logic, hardware, firmware, etc. Also, some or all of the example process of FIG. 5 may instead be implemented manually or as any combination of any of the foregoing techniques, for example, any combination of firmware, software, discrete logic and/or hardware. Further, many other methods of implementing the example operations of FIG. 5 may be employed. For example, the order of execution of the blocks may be changed, and/or one or more of the blocks described may be changed, eliminated, sub-divided, or combined. Additionally, any or all of the example process of FIG. 5 may be carried out sequentially and/or carried out in parallel by, for example, separate processing threads, processors, devices, discrete logic, circuits, etc.

The example process of FIG. 5 begins with the example user interface module 330 of FIG. 3 determining whether updated intra-VPN connectivity configuration information has been received (block 505). If updated intra-VPN connectivity configuration information has been received (block 505), the example intra-VPN connectivity controller 325 makes corresponding updates to the example intra-VPN connectivity database 305 (block 510). Control then returns to block 505.

If updated intra-VPN connectivity configuration information was not received (block 505), the example multi-protocol BGP engine 320 of FIG. 3 determines whether a B GP advertisement was received via the example network interface 315 (block 515). If a BGP advertisement was not received (block 515), control returns to block 505.

If a BGP advertisement was received (block 515), the multi-protocol BGP engine 320 broadcasts the received BGP advertisement (block 520). The multi-protocol BGP engine 320 queries the intra-VPN connectivity controller 325 to determine whether modified copies of the received BGP advertisement are to be broadcast (block 525). If the intra-VPN connectivity controller 325 determines that no modified copies of the received BGP advertisement are to be broadcast (block 525), control returns to block 505.

If based on a query of the example intra-VPN connectivity database 305, the intra-VPN connectivity controller 325 returns one or more RTs (block 525), the multi-protocol BGP engine 320 creates one or more corresponding copies of the received BGP advertisement (block 530), modifies the RT of the copy(-ies) with respective ones of the returned RT(s) (block 535), and broadcasts the modified BGP advertisement(s) (block 540). Control then returns to block 505.

Figure 6:
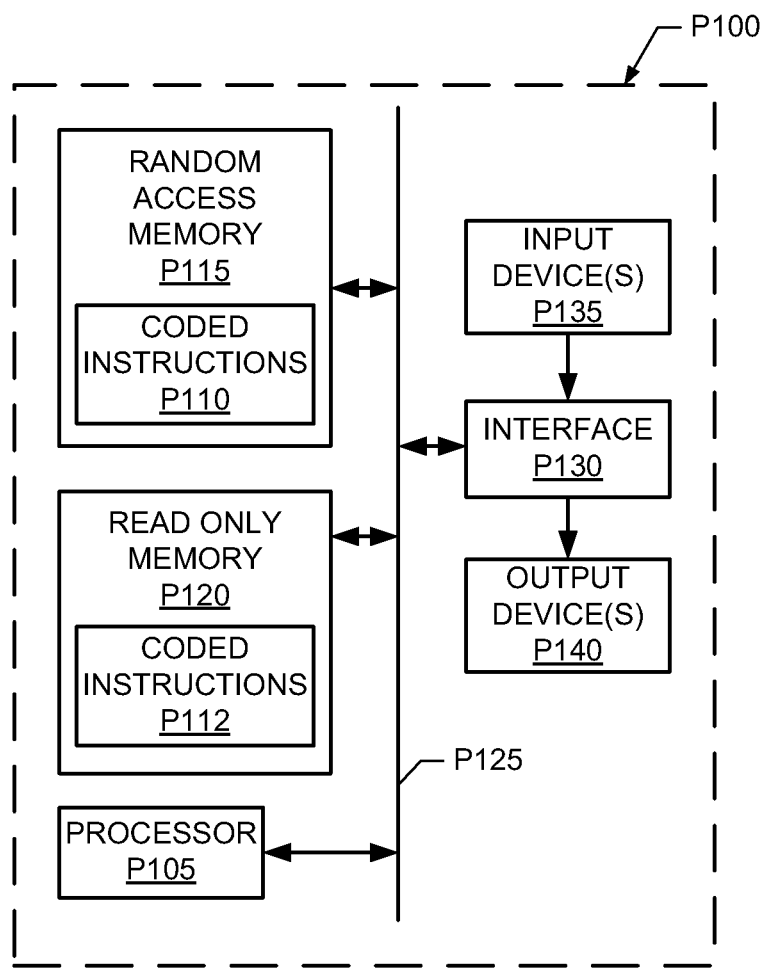
FIG. 6 is a schematic illustration of an example processor platform that may be used and/or programmed to carry out the example process of FIG. 5 and/or to implement any of all of the methods and apparatus disclosed herein.

FIG. 6 is a schematic diagram of an example processor platform P100 that may be used and/or programmed to implement any of the example route servers 140 of FIGS. 1 and/or 2. For example, the processor platform P100 can be implemented by one or more general-purpose processors, processor cores, microcontrollers, etc.

The processor platform P100 of the example of FIG. 6 includes at least one general purpose programmable processor P105. The processor P105 executes coded instructions P110 and/or P112 present in main memory of the processor P105 (e.g., within a RAM P115 and/or a ROM P120). The processor P105 may be any type of processing unit, such as a processor core, a processor and/or a microcontroller. The processor P105 may execute, among other things, the example process of FIG. 5 to implement the example methods and apparatus described herein.

The processor P105 is in communication with the main memory (including a ROM P120 and/or the RAM P115) via a bus P125. The RAM P115 may be implemented by DRAM, SDRAM, and/or any other type of RAM device, and ROM may be implemented by flash memory and/or any other desired type of memory device. Access to the memory P115 and the memory P120 may be controlled by a memory controller (not shown). One or both of the example memories P115 and P120 may be used to implement the example intra-VPN connectivity database 305 of FIG. 3.

The processor platform P100 also includes an interface circuit P130. The interface circuit P130 may be implemented by any type of interface standard, such as an external memory interface, serial port, general-purpose input/output, etc. One or more input devices P135 and one or more output devices P140 are connected to the interface circuit P130. The input devices P135 and/or output devices P140 may be used to, for example, implement the network interface 315 of FIG. 3.

Although certain example methods, apparatus and articles of manufacture have been described herein, the scope of coverage of this patent is not limited thereto. On the contrary, this patent covers all methods, apparatus and articles of manufacture fairly falling within the scope of the appended claims either literally or under the doctrine of equivalents.

What is claimed is:

1. A method, comprising:
broadcasting, with a route server, an original border gateway protocol advertisement as received at the route server;
determining, with the route server, a first provider edge router is to be configured for additional connectivity beyond a connectivity defined in a table associated with the first provider edge router, the additional connectivity including an identification of a second provider edge router to which the first provider edge router is to be communicatively coupled, the additional connectivity identified in an entry for a first pair of provider edge routers in a virtual private network (intra-VPN) connectivity database, the intra-VPN connectivity database including entries for a plurality of pairs of provider edge routers;

generating, with the route server, a copy of the original border gateway protocol advertisement;

modifying, with the route server, the copy of the original border gateway protocol advertisement to facilitate the additional connectivity; and broadcasting, with the route server, the modified copy of the original border gateway protocol advertisement.

2. The method of claim 1, further including:

receiving a second border gateway protocol advertisement from the first provider edge router, the second border gateway protocol advertisement including a first border gateway protocol route target attribute included in an export policy of the virtual routing and forwarding table associated with the first provider edge router;

generating a copy of the second border gateway protocol advertisement; and modifying the first border gateway protocol route target attribute of the copy to correspond to the additional connectivity.

3. The method of claim 1, wherein the entry in the database for the first pair of provider edge routers includes an indication that connectivity between the first provider edge router and the second provider edge router is unconditionally enabled.

4. The method of claim 1, wherein the entry in the database for the first pair of provider edge routers includes a time of day range that specifies when connectivity is restricted between the first provider edge router and the second provider edge router.

5. The method of claim 1, wherein the entry in the database for the first pair of provider edge routers includes at least one of a time of day range that specifies when connectivity is enabled between the first provider edge router and the second provider edge router and a time of day range that specifies when connectivity is disabled between the first provider edge router and the second provider edge router.

6. The method of claim 1, wherein the entry in the database for the first pair of provider edge routers includes a condition when connectivity is restricted between the first provider edge router and the second provider edge router.

7. The method of claim 6, wherein the connectivity is restricted by disabling the connectivity between the first provider edge router and the second provider edge router.

8. The method of claim 6, wherein the condition includes detecting a security anomaly.

9. A route server, comprising:

a memory including machine readable instructions; and a processor to execute the instructions to cause the route server to perform operations including:

broadcasting an original border gateway protocol advertisement as received at the route server;

determining a first provider edge router is to be configured for additional connectivity beyond a connectivity defined in a table associated with the first provider edge router, the additional connectivity to communicatively couple a second provider edge router to the first provider edge router, the additional connectivity stored as an entry for a first pair of provider edge routers in a virtual private network (intra-VPN) connectivity database, the intra-VPN connectivity database including entries for a plurality of pairs of provider edge routers;

generating a copy of the original border gateway protocol advertisement;

modifying the copy of the original border gateway protocol advertisement to facilitate the additional connectivity; and broadcasting the modified copy of the original border gateway protocol advertisement.

10. The route server of claim 9, wherein the entry in the database for the first pair of provider edge routers includes an indication that the connectivity between the first provider edge router and the second provider edge router is unconditionally enabled.

11. The route server of claim 9, wherein the entry in the database for the first pair of provider edge routers includes a time of day range that specifies when connectivity is restricted between the first provider edge router and the second provider edge router.

12. The route server of claim 9, wherein the entry in the database for the first pair of provider edge routers includes at least one of a time of day range that specifies when connectivity is enabled between the first provider edge router and the second provider edge router and a time of day range that specifies when connectivity is disabled between the first provider edge router and the second provider edge router.

13. The route server of claim 9, wherein the entry in the database for the first pair of provider edge routers includes a condition when connectivity is restricted between the first provider edge router and the second provider edge router.

14. The route server of claim 13, wherein the connectivity is restricted by disabling the connectivity between the first provider edge router and the second provider edge router.

15. The route server of claim 13, wherein the condition includes detecting a security anomaly.

16. The route server of claim 9, further including:

a user interface to allow a user to configure the intra-VPN connectivity database.

17. The route server of claim 16, wherein the user is at least one of associated with the first pair of provider edge routers and is associated with an operator of a service-provider network.

18. The router server of claim 9, wherein the database is stored in the memory.

\* \* \* \* \*